United States Patent
Gillen et al.

(10) Patent No.: US 10,793,719 B2
(45) Date of Patent: Oct. 6, 2020

(54) ELASTOMERIC COMPOSITIONS PROVIDING IMPROVED WET GRIP

(71) Applicant: KRATON POLYMERS LLC, Houston, TX (US)

(72) Inventors: Jason D. Gillen, Houston, TX (US); Bhavesh Shah, Houston, TX (US); Jeremie Pichereau, Almere (NL); Arwin W. van der Waal, Amsterdam (NL); Joris Smit, Amsterdam (NL)

(73) Assignee: Kraton Polymers LLC, Houston, TX (US)

( * ) Notice: Subject to any disclaimer, the term of this patent is extended or adjusted under 35 U.S.C. 154(b) by 12 days.

(21) Appl. No.: 16/147,672

(22) Filed: Sep. 29, 2018

(65) Prior Publication Data

US 2019/0100652 A1 Apr. 4, 2019

Related U.S. Application Data

(60) Provisional application No. 62/565,476, filed on Sep. 29, 2017.

(51) Int. Cl.
| | |
|---|---|
| *C08L 93/00* | (2006.01) |
| *C08L 53/02* | (2006.01) |
| *C08L 9/00* | (2006.01) |
| *C08L 25/16* | (2006.01) |
| *C08L 47/00* | (2006.01) |
| *C08K 5/00* | (2006.01) |

(52) U.S. Cl.
CPC ............... *C08L 93/00* (2013.01); *C08L 9/00* (2013.01); *C08L 25/16* (2013.01); *C08L 47/00* (2013.01); *C08L 53/025* (2013.01); *C08F 2500/01* (2013.01); *C08F 2500/17* (2013.01); *C08F 2500/21* (2013.01); *C08F 2800/20* (2013.01); *C08K 5/005* (2013.01); *C08K 5/0016* (2013.01); *C08L 2205/03* (2013.01); *C08L 2205/035* (2013.01); *C08L 2207/04* (2013.01)

(58) Field of Classification Search
CPC ........... C08L 2205/035; C08L 2205/03; C08L 53/025; C08L 53/02
See application file for complete search history.

(56) References Cited

U.S. PATENT DOCUMENTS

| | | | | |
|---|---|---|---|---|
| 5,723,543 | A * | 3/1998 | Modic | C08L 23/02 525/98 |
| 7,244,785 | B2 | 7/2007 | Bening et al. | |
| 2004/0151933 | A1 | 8/2004 | Ajbani et al. | |
| 2013/0231433 | A1* | 9/2013 | Date | C08L 23/10 524/445 |
| 2017/0313860 | A1* | 11/2017 | Takenaka | C08J 3/22 |
| 2018/0298254 | A1* | 10/2018 | Matsuda | B32B 27/40 |

FOREIGN PATENT DOCUMENTS

| | | |
|---|---|---|
| EP | 3150660 A1 | 4/2017 |
| WO | 2017043008 A1 | 3/2017 |

\* cited by examiner

*Primary Examiner* — Jeffrey C Mullis
(74) *Attorney, Agent, or Firm* — Ramesh Krishnamurti

(57) ABSTRACT

The disclosure relates to elastomeric compositions having improved soft touch feel to skin, and in particular grip, especially during wet/humid conditions. In one embodiment, the compositions are part of a composite system, wherein the compositions are connected, for example bonded, molded, over-molded or co-extruded to a substrate, such as a thermoplastic, wood, glass or metal. The elastomeric composition comprises: (a) one or more copolymers present in an amount of 10 wt. % to 90 wt. %, selected from styrenic block copolymers and isoprene polymers; (b) one or more resins an amount of 2 wt. % to 20 wt. %; and optionally (c) at least one softener, filler, antioxidant or the like present in an amount up to 80 wt. %. The resin is selected from coumarone-indene resin, petroleum hydrocarbon resin, terpene based polymers, styrene-alpha-methyl-styrene resins, rosin derived resins, and mixtures thereof.

20 Claims, No Drawings

ELASTOMERIC COMPOSITIONS PROVIDING IMPROVED WET GRIP

RELATED APPLICATIONS

This application claims priority from U.S. Provisional Application No. 62/565,476, with a filing date of Sep. 29, 2017, the entire disclosures of which is incorporated herein by reference for all purposes.

TECHNICAL FIELD

The disclosure relates to elastomeric compositions having improved soft touch feel to skin, and in particular grip, especially during wet and humid conditions.

BACKGROUND

Many items, consumer, household and industrial, include grips or handles that are designed to be grasped by the user. Depending on the function of the items, the pressure exerted by the user may vary, but generally it is desirable that a sufficient grasp is maintained so that the handle does not fall out of the user's hand. Various grips or handles comprise a polymer. Thermoplastic elastomers, especially those with hardness below Shore A 95, have excellent dry grip and, therefore, are widely being used to overmold onto hard substrates to provide a soft touch surface with excellent grip. When a handle becomes wet during use, such as during the normal use of the item in the case of a cooking utensil or a personal care tool, by normal conditions of use such as rain or humidity, or even sweat from the user, the item's handle can become slippery and difficult to grip.

Moreover, many individuals desire handles that offer a soft feel that is pleasing to touch, as well as handles that have good grip when moist, wet or soapy. In some cases, it is desirable to have good grip under moist, wet or soapy conditions while maintain low friction characteristics when under dry conditions. Different attempts have been set forth in order to improve wet grip, including adding polar polymers, such as polyurethane, and adding abrasive filler to make the surface of the item rough. Many tackifiers, such as polyisobutylene, improve grip under dry conditions, and only moderately improve the grip under wet conditions. The product, when containing too much tackifier, is usually sticky and not suitable for use as a grip or handle.

There is a need for a composition suitable for use as a grip or handle or a portion of a grip or handle that has improved properties such as good grip, particularly in wet conditions.

SUMMARY

In one aspect, the disclosure relates to an elastomeric composition having improved wet grip properties. The composition comprises: a) from 3 to 50 wt. % of a resin selected from the group consisting of coumarone-indene resins, petroleum hydrocarbon resins, terpene based resins, styrene-alpha-methyl-styrene resins, terpene phenol resins, rosin derived resins and copolymers and/or mixtures thereof; b) a first polymer in an amount of 40-95 wt % based on the total weight of the elastomeric composition, the first polymer selected from the group of: i) a selectively hydrogenated block copolymer having the general configuration A-B-A, (A-B)n, (A-B-A)n, (A-B-A)nX, (A-B)nX or mixtures thereof, wherein n is an integer from 2 to about 30, and X is coupling agent residue, B is a controlled distribution copolymer block of at least one conjugated diene and at least one mono alkenyl arene; wherein prior to hydrogenation, each block A is a polymer block of one or more mono alkenyl arenes having a number average molecular weight between 3,000 and 60,000 based upon the total weight of the block copolymer, each block B has a number average molecular weight of 30,000 to 300,000 based upon the total weight of the block copolymer; ii) a triblock copolymer having the general configuration S-E-S, $(S-E1)_n$, $(S-E1)_nS$, $(S-E1)_nX$ or mixtures thereof, wherein n has a value of 2 to 6 and X is a coupling agent residue; wherein prior to hydrogenation S is a polystyrene block, E is a polydiene block, selected from the group consisting of polybutadiene, polyisoprene and mixtures thereof, having a molecular weight of from 20,000 to 220,000 based upon the total weight of the block copolymer, and E1 is a polydiene block, selected from the group consisting of polybutadiene, polyisoprene and mixtures thereof, having a molecular weight of from 20,000 to 220,000 based upon the total weight of the block copolymer; and iii) a homopolymer or copolymer of isoprene and another conjugated diene and/or olefinically unsaturated monomer wherein the copolymer can be of random, tapered, block or otherwise structure; c) a second polymer in an amount of 5-55 wt %, selected from the group of C4 to C20 olefins, thermoplastic elastomers, styrene-butadiene rubbers, ethylene-propylene rubbers, ethylene-propylene-diene rubbers, urethane rubber, and combinations thereof; d) optionally, at least one of a softener, a plasticizer, an antioxidant, a stabilizer, a colorant, a filler, and mixtures thereof in an amount of 0 to 80 wt. %; and wherein when the first polymer is homopolymer or copolymer of isoprene, the composition further comprises 0.03-25 wt % of: x) a curing agent selected from sulfur, sulfur-containing compounds, radical curing agents, and peroxides; and y) a co-agent selected from monofunctional-, difunctional- or trifunctional methacrylic monomers; and wherein the composition has a static coefficient of friction in a wet state of at least 1.2 and a kinetic coefficient of friction in wet state of at least 1.2.

DETAILED DESCRIPTION

The following terms will be used throughout the specification.

"Elastomer" may be used interchangeably with the term "rubber." Elastomer refers to any polymer or combination of polymers consistent with the ASTM D1566 definition.

"Polymer" and "interpolymer" are used broadly herein, and interchangeably mean higher oligomers having a number average molecular weight (Mn) equal to or greater than 100, as well as compounds that meet the molecular weight requirements for polymers according to classic ASTM definitions, prepared by the polymerization or oligomerization of at least two different monomers, including copolymers, terpolymers, tetrapolymers, and the like.

"Type A Durometer Hardness" or "Hs" means the hardness of a composition measured according to ASTM D2240.

"Tear strength" means the tear strength of a rubber composition measured according to ASTM D624.

"Vinyl" refers to the presence of a pendant vinyl group on the polymer chain.

"Vinyl content" is used to describe a polymer that is made when the conjugated diene 1,3 butadiene is polymerized via 1,2-addition (and isoprene via a 3,4-addition), resulting in a pendant olefin, or vinyl group, adjacent to the polymer backbone. Vinyl content can be effectively controlled by varying the relative amount of the distribution agent, thus creating the controlled distribution of the mono alkenyl arene and conjugated diene, and controlling the microstructure of the conjugated diene.

"Controlled distribution" refers to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) monoalkenyl arene units; and (3) an overall structure having relatively low blockiness. The term, "rich in" is defined as greater than the average amount, preferably greater than 5% of the average amount.

"Styrene blockiness" means the proportion of styrene units in a polymer having two styrene units as the nearest neighbors on the polymer chain. The styrene blockiness can be determined by 1H NMR spectroscopy using the methodology described in U.S. Pat. No. 7,244,785 B2.

"Plasticizer oil", "plasticizer", and "softener" mean a (oil-based) compound known as an additive for changing properties of a material in the art. The plasticizer may include, but not limited to, paraffin oil, mineral oil, ester oil, hydrocarbon-based synthetic lubricating oils, naphthenic oils, and vegetable oils.

"Molecular weight(s)" refers to the true molecular weight in g/mole of the polymer or block of the copolymer.

The disclosure relates to elastomeric compositions having improved soft touch feel to skin, and in particular grip, especially during wet, soapy and humid conditions. In one embodiment, the elastomeric composition includes a resin and one or more of a styrenic block copolymer, or one or more synthetic polyisoprene rubber, or a combination of these. All weight percentages provided herein are based upon the total weight of the elastomeric composition.

Component (a)—First Polymer:

The first polymer component (a) is selected from the group of polyisoprene rubber, selectively hydrogenated styrenic block copolymers ("HSBC"), and combinations thereof.

In an embodiment, component (a) is polyisoprene rubber. Synthetic isoprene polymers are known and include homopolymers and copolymers of isoprene and another conjugated diene and/or olefinically unsaturated monomer, with at least 50 mol % of the polymer backbone is based on isoprene. Homopolymers are often referred to as isoprene rubber, or IR. The isoprene polymer can be an anionically produced IR, IR produced by Ziegler-Natta catalysis, or with a neodymium catalyst. Natural rubber (NR) is likewise a homopolymer of isoprene. Copolymers include polymers comprising isoprene and another conjugated diene and/or olefinically unsaturated monomer in the polymer backbone. Examples include copolymers of butadiene and isoprene, or isoprene and styrene, and the like. Copolymers may be random, tapered, block or otherwise structured. Isoprene polymers may be linear or branched. Moreover, they may be functionalized.

In embodiments, the isoprene polymers have a molecular weight greater than 250,000, or greater 500,000. In embodiments of isoprene homopolymers, they have a cis content of greater than 80%, believed to be beneficial to the flexibility of the composition.

In embodiments, component (a) comprises one or more styrenic block copolymers ("SBC"). Examples include selectively hydrogenated block copolymers having at least two blocks A and at least one block B, of a general configuration A-B-A, (A-B)$_n$, (A-B-A)nX, or (A-B)nX, where n is an integer from 2 to 30, alternatively 2 to about 15 or alternatively 2 to 6, and X is residue of a coupling agent. Prior to hydrogenation, each block A is a polymer block of one or more mono alkenyl arenes having a number average molecular weight between 3,000 and 60,000 based upon the total weight of the block copolymer. Each block B has a number average molecular weight of 30,000 to 300,000 based upon the total weight of the block copolymer. Each block B is a controlled distribution copolymer block of at least one conjugated diene and at least one mono alkenyl arene. The total amount of mono alkenyl arene in the block copolymer is between 20 and 80 percent by weight and the weight percent (wt. %) of mono alkenyl arene in each B block is between 10% and 75%. Each B block comprises terminal regions adjacent to the A blocks that are rich in conjugated diene and one or more regions not adjacent to the A blocks that are rich in mono alkenyl arene units. Each block B has a mono alkenyl arene blockiness index of less than 50 mol %, said mono alkenyl arene blockiness index being the proportion of mono alkenyl arene units in the block B having two mono alkenyl arene neighbors on the polymer chain.

In embodiments, component (a) comprises a selectively hydrogenated block copolymer (HSBC) having an S block and an E or E1 block and having the general formula S-E-S, (S-E1)n, (S-E1)nS, (S-E1)nX or mixtures thereof, where n has a value of 2 to 6, and X is a coupling agent residue. Prior to hydrogenation, the S block is a polystyrene block, and the E block is a polydiene block, selected from the group consisting of polybutadiene, polyisoprene and mixtures thereof, having a molecular weight of from 20,000 to 220,000 based upon the total weight of the block copolymer. Prior to hydrogenation, the E1 block is a polydiene block, selected from the group consisting of polybutadiene, polyisoprene and mixtures thereof, having a molecular weight of from 20,000 to 220,000 based upon the total weight of the block copolymer. The styrene content of the block copolymer is from 10 to 70 wt. % based upon the total wt. % of the block copolymer, and the vinyl content of the polydiene block prior to hydrogenation is from 30 to 85 mol % based upon the total mol % of the block copolymer. Subsequent to hydrogenation, 0-10% of the styrene double bonds have been hydrogenated and at least 80% of the conjugated diene double bonds have been hydrogenated. The molecular weight of each of the S blocks is from 5,000 to 60,000 based upon the total weight of the block copolymer.

In embodiments, component (a) is present in an amount of 40-95 wt %, or from 45 to 90 wt. %.

Component (b)—Second Polymer.

Component (b) is a second polymer which is different from component (a). In embodiments, component (b) is processed together with component (a) at a relatively low mixing processing temperature, e.g., less than 150° C. Polymers having a mixing processing temperature above 150° C. may, during prolonged mixing procedures, affect component (a), e.g., discoloration and degradation. In embodiments, component (b) has a processing temperature of less than 135° C., more preferably less than 130° C.

Component (b) in one embodiment is a butadiene polymer, and which is different from component (a). In embodiments, component (b) is selected from polymers made from C4 to C20 olefins; thermoplastic elastomers (TPEs), styrene-butadiene rubber (SBR), ethylene-propylene rubber (EPM), ethylene-propylene-diene rubber (EPDM), urethane rubber, syndiotactic 1,2-polybutadiene, styrene-isoprene-styrene (SIS), sytrene-ethylene-butadiene-styrene (SEBS), and any other polymer which is referred to as rubber in the prior art.

In one embodiment wherein component (a) is polyisoprene rubber, component (b) syndiotactic 1,2-polybutadiene. In another embodiment where component (a) is a styrenic block copolymer, component (b) is a polyolefin, e.g., polypropylene.

Component (b) in one embodiment is present in an amount of 5-55 wt %, more preferably in an amount of 10-50 wt %.

Components (c) and (d).

In embodiments where component (a) is polyisoprene rubber, the composition further includes a curing agent component (c), which may include, for instance, sulfur, sulfur-containing compounds, radical curing agents, and peroxides. In embodiments, component (c) is a peroxide selected from the group of 2,5-dimethyl-2,5-di-(t-butylperoxy)hexane, dicumyl peroxide, benzoyl peroxide, 1,1-bis-(t-butylperoxy)-3,5,5-trimethylcyclohexane, diisobutyryl peroxide, cumylperoxy neodecanoate, di-n-propylperoxy dicarbonate, di-isopropyl peroxy dicarbonate, di-sec-butylperoxy dicarbonate, 1,1,3,3-tetramethyl-butylperoxy neodecanoate, di-(4-t-butylcyclohexyl)peroxy dicarbonate, di(2-ethylhexyl)peroxy dicarbonate, t-hexylperoxy neodecanoate, t-butylperoxy neodecanoate, t-butylperoxy neoheptanoate, t-hexylperoxy pivalate, t-butylperoxy pivalate, di(3,5,5-trimethyl-hexanoyl) peroxide, dilauroyl peroxide, 1,1,3,3-tetramethyl-butylperoxy-2-ethylhexanoate, disuccinic acid peroxide, 2,5-dimethyl-2,5-di(2-ethylhexanoylperoxy)hexane, t-hexylperoxy-2-ethylhexanoate, di(4-methyl-benzoyl) peroxide, t-butylperoxy-2-ethylhexanoate, di(3-methyl-benzoyl) peroxide, benzoyl(3-methyl-benzoyl) peroxide, dibenzoyl peroxide, 1,1-di(t-butylperoxy)-2-methyl-cyclohexane, 1,1-di(t-hexylperoxy)-3,3,5-trimethylcyclohexane, 1,1-di(t-hexylperoxy)cyclohexane, 1,1-di(t-butylperoxy) cyclohexane, 2,2-di(4,4-di(t-butylperoxy)cyclohexyl) propane, t-hexylperoxyisopropyl monocarbonate, t-butylperoxy maleic acid, t-butylperoxy-3,5,5-trimethyl hexanoate, t-butylperoxy laurate, t-butylperoxyisopropyl monocarbonate, t-butylperoxy-2-ethylhexyl monocarbonate, t-hexylperoxy benzoate, 2,5-dimethyl-2,5-di(benzoylperoxy)hexane, t-butylperoxy acetate, 2,2-di-(t-butylperoxy) butane, t-butylperoxy benzoate, n-butyl-4,4-di-(t-butylperoxy) valerate, di(2-t-butylperoxyisopropyl)benzene, di-t-hexyl peroxide, t-butylcumyl peroxide, di-t-butyl peroxide, p-menthane hydroperoxide, 2,5-dimethyl-2,5-di(t-butylperoxy)hexyne-3, diisopropylbenzene hydroperoxide, 1,1,3,3-tetramethyl-butyl hydroperoxide, cumene hydroperoxide, t-butyl hydroperoxide, and mixtures thereof.

With the use of component (c) as a curing agent, the composition further includes a co-agent component (d), selected from the group of monofunctional-, difunctional- or trifunctional methacrylic monomers, including ethylene glycol dimethacrylate (EGDMA), diethylene glycol dimethacrylate (DEGDMA), triethylene glycol dimethacrylate (TiEGDMA), 1,3-butylene glycol dimethacrylate (BGDMA), trimethylolpropane trimethacrylate (TMPTMA) triallyl isocyanurate, triallyl cyanurate, diethylene glycol diacrylate, neophenylene glycol diacrylate and mixtures thereof.

In embodiments, the curing agent and the co-agent are used in a weight ratio (c) to (d) of 1:160, more preferably 1:50. Component (c) and (d) are preferably present in an amount of 0.03-25 wt. %, or an amount of 0.05-20 wt %.

Examples of component (c) and (d) in a combination is 1,1-di(tert-butylperoxy)-3,3,5-trimethylcyclohexane and TMPTMA.

Component (e)—Resin.

The composition further includes at least a resin selected from terpene-based resins, hydrocarbon-based resins, rosin-based resins and combinations thereof.

In one embodiment, the resin is a terpene-based resin comprising α-pinene, β-pinene, δ-3 carene, limonene, dipentene, β-phellandrene and pyrolysates of α-pinene, β-pinene, δ-3 carene, δ-2 carene, turpentine, dipentene, limonene, and combinations thereof. Other examples of terpene resins include polyterpene resins and terpene phenol resins. The polyterpene resin is a resin obtained by polymerizing a terpene compound, or a hydrogenated product of the resin. Examples of terpene phenol resins include resins prepared by cationic polymerization of the terpene compound, a phenol compound, and condensation reactions with formalin. Examples of the phenol compound include phenol, bisphenol A, cresol, and xylenol.

In some embodiments, the resin is an aromatic petroleum resin, for example, resins obtained by polymerizing a C8 to C10 aromatic fraction which is generally obtained by naphtha cracking and which includes, as a main monomer, vinyltoluene, indene, or methylindene. Other aromatic fractions include styrene analogues such as α-methylstyrene or β-methylstyrene and styrene. The aromatic petroleum resin may contain a coumarone unit. The aromatic petroleum resin may also contain an aliphatic olefin unit, a phenol unit, or a cresol unit. Examples of the aromatic petroleum resins include coumarone-indene resins, indene resins, aromatic vinyl polymers (resins obtained by polymerizing α-methylstyrene and/or styrene), and C9 hydrocarbon resins. Other examples include substituted or unsubstituted units derived from cyclopentadiene homopolymer or copolymer resins, dicyclopentadiene homopolymer or copolymer resins, C5 fraction homopolymer or copolymer resins, C9 fraction homopolymer or copolymer resins, alpha-methylstyrene homopolymer or copolymer resins, and combinations thereof. Examples include resin comprising substituted or unsubstituted units derived from the group consisting of cyclopentadiene homopolymer or copolymer resins (referred to as CPD), dicyclopentadiene homopolymer or copolymer resins (referred to as DCPD or (D)CPD).

In other embodiment, the resin may further include units derived from (D)CPD/vinylaromatic copolymer resins, (D)CPD/terpene copolymer resins, terpene/phenol copolymer resins, (D)CPD/pinene copolymer resins, pinen/phenol copolymer resins, (D)CPD/C5 fraction copolymer resins, (D)CPD/C9 fraction copolymer resins, terpene/vinylaromatic copolymer resins, terpene/phenol copolymer resins, pinene/vinylaromatic copolymer resins, pinene/phenol resins, C5 fraction/vinylaromatic copolymer resins, and combinations thereof.

In one embodiment, the resin may be used as an extender for the elastomeric composition. The resins may be used alone and in combination of two or more thereof, in an amount at least 3 wt. %, or at least 5 wt. %, or from 5 to 50 wt. %, or from 10 to 30 wt. %, or less than 70 wt. %, or from 3 to 50 wt. %.

In one embodiment, the resin is a terpene phenol resin characterized by a Tsp ranging from 85° C. to 160° C. and/or by a hydroxyl number ranging from 5 mg KOH/g to 240 mg KOH/g. The hydroxyl value may be determined in accordance with ASTM E222. In another embodiment, the resin is a vinyl aromatic resin such as α-methyl styrene ("AMS"), characterized as having a Tsp from 80° C. to 130° C., alternatively from 80° C. to 105° C., or alternatively from 80° C. to 90° C.

Component (f)—Optional Additives.

The composition can optionally include components such as softeners, fillers, antioxidants, catalysts, tackifying resins, additional polymers, crosslinking agents, curing agents and co-agents. In some embodiments, the elastomeric composition includes at least one of, for example, colorants, modifiers, finishing agents (e.g., zinc laurate), antioxidants (e.g., monophenol, bisphenol, polyphenol, sulfur, phosphorus-based compounds, reducing agents, oxygen scavengers, light stabilizers, antacids, pH stabilizers, surface treatment agents, heat stabilizers, colorants, pigments, fillers, surfactants, gelling agents, biocides, UV absorbents (e.g., salicylic acid, benzophenone, benzotriazole, cyanoacrylate, and hindered amine), dusting agents (e.g., polyolefin such as polyethylene, silica, talc, calcium carbonate powder), flame retardants, anti-stat agents, antioxidants, processing aids, and polyphosphoric acid. The optional components, independently, may be utilized within ranges not adversely affecting the performance of the elastomeric compositions.

Fillers may be inorganic fillers, e.g., calcium carbonate, talc, clay, silica, titanium dioxide, carbon black, barium sulfate, mica, glass fibers, whiskers, carbon fibers, magnesium carbonate, glass powders, metal powders, kaolin, graphite, and molybdenum disulfide. The colorant may include any conventional colorants used in the art, such as color pigments, extender pigments, anti-corrosive pigments, and functional pigments (e.g., phthalocyanine green, titanium, iron blue, iron oxide, lead suboxide, and zinc sulfide).

In some embodiments, the elastomeric composition further includes a softener such as a mineral oil softener, or synthetic resin softener, a plasticizer, or combinations thereof. The softener may beneficially reduce the temperatures at which the compositions are processable. Oil softeners are generally mixes of aromatic hydrocarbons, naphthene hydrocarbons and paraffin, e.g., aliphatic hydrocarbons. Examples of synthetic softeners include, but not limited to, polyisobutylene, polybutenes and low molecular weight polybutadienes. In other embodiments, the elastomeric composition is substantially free of oil as a softener to avoid oil bleeding.

The elastomeric composition can optionally include polyolefins, e.g., amorphous or crystalline homopolymers or copolymers of two or more different monomers derived from alpha-monoolefins having from 2 to 12 carbon atoms, and preferably from 2 to 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low density polyethylene, high-density polyethylene, linear-low-density polyethylene, poly-propylene (isotactic and syndiotactic), ethylene/propylene copolymers, and polybutene, and olefinic block copolymers.

Component (f), alone or in any combination, may be present in an amount of from 0 to 80 wt. % based upon the total weight % of the elastomeric composition.

Method of Making.

In some embodiments, the composition can be made by mixing components (a), (b), (e) and (f) to obtain a mixture. In embodiments where component (a) is a polyisoprene rubber, the method further includes adding a curing agent (c) and co-agent (d) to the mixture; uniformly kneading the mixture, and curing the mixture for at least 5 minutes at at least 135° C. and less than 185° C. In one embodiment, the curing is up to 20 minutes.

In one embodiment with polyisoprene rubber for component (a), the mixing is performed according to a "roller mill procedure," starting with the mastication of component (a), e.g., synthetic polyisoprene using a roller mill that is operating at conventional conditions, e.g., roller speed in the range of 17 to 20 rotations per minute, whereas the rollers are maintained at 55° C. In step 1, component (b) (e) and (f) are combined with the masticated component (a). One may start with component (b) and introduce this onto the roller mill operated at a temperature less than 150° C., e.g., 120° C. Next, the the masticated component (a), component (e) and/or component (f) may be added. The order is not important, as long as the produced is well mixed and the product remains transparent and basically colorless. Due to friction, the temperature may rise. Higher temperatures may be used, e.g., where the temperature is allowed to rise to 150° C., however which may have some effects on the color and stability of component (a). Once the mixing is completed, the mixture is removed from the roller mill ("sheet off").

In some embodiments for step 2, the roller mill is operated at 55° C. and the components (c) and (d) are added. Preferably component (d), if any, is added first. The procedure is similar to that of step (1) for mixing to be carried out at 130° C. or less, whereby elevated temperatures that may cause pre-cure. The product is again sheeted off. Mixing may also be performed with an internal mixer. In one embodiment, component (a) is masticated first. To this the components (b), (f) and (c) and (d) are added. In embodiments for step (2), the internal mixture is set to 50° C. and first component (d) is added. Next component (c) is added. To avoid pre-cure, the core temperature of the mixture is kept below 90° C. In some embodiments, the mixture is allowed to mature before use. During the maturation process, the mixture can be maintained at ambient temperature for at least 2 or more hours, preferably 6 or more hours, more preferably 10 or more hours.

In some embodiments, the composition can be prepared using an external mixer procedure with the steps: add component (a) in the mixer and mix for on full pressure. Next, add half of the component (b), add components (e) and (f) and the rest of component (b), and mix on full pressure until the temperature rises to above 50° C., e.g., 90° C. The mixture is then cool, e.g., to 80° C., before component (d) is added. In some embodiments, the compositions may be made by techniques well known in the art, such as, for example, extrusion.

Properties:

In embodiments, the composition is characterized as having a Type A Durometer hardness measured at 30 seconds of at least 35, or from 35 to 80, or from 40 to 70, or from 50 to 70. The composition is suitable for products used under a severe environment, such as footwear (e.g., shoe sole) and rubber tire, with Type A Durometer of 60 to 70.

The elastomeric composition in one embodiment has a tear strength measured by 2 mm-thick sheet (and converted in N/mm unit) according to ASTM D624 of at least 10 N/mm, or from 10 N/mm to 50 N/mm, or from 10 N/mm to 40 N/mm. In embodiments, the composition has a tensile at break of from 500 psi to 5000 psi as measured according to ASTM D412, or at least 1000 psi; an elongation at break of from 500% to 2000% as measured according to ASTM D412; a 100% modulus as measured according to ASTM D412 of 50 to 300.

In embodiments, the composition has a static coefficient of friction in dry state of from 1.0 to 1.7, and a kinetic coefficient of friction in dry state from 1.0 to 1.7.

In embodiments, the composition has a static coefficient of friction in a wet state of at least 1.2, or from 1.3 to 3.5, or at least 1.4, or at least 1.5; and a kinetic coefficient of friction in wet state of at least 1.2, or from 1.3 to 3.5, or at least 1.4, or at least 1.5.

Applications:

The composition can be processed by one or more of an extrusion and injection molding process in order to form the structure such as a sleeve that may be bonded onto a substrate as desired. The composition can then be used to form the final product, by compression molding, extrusion molding, injection molding, and the like.

In some embodiments, the elastomeric composition can be connected to a substrate, for example by bonding, molding or via an adhesive mechanism, wherein the substrate may be, for example, one or more of polymer, glass, wood or metal, thus forming a composite. In embodiments where the composition is part of a composite system, wherein the compositions are connected, for example bonded, molded, over-molded or co-extruded to the substrate, for use wherever desirable feel and grip are needed, such as handles or grips of household, industrial items, and in the automotive industry, such as in tires.

Overmolding generally involves bonding the elastomeric composition to a polymeric substrate utilizing a two-shot or multi-shot injection molding process or co-injection molding process. Overmolding generally requires a special injection molding machine that is equipped with two or more barrels, allowing two or more materials to be shot into the same mold in the same cycle. In embodiments, the curing to use is at a temperature between 130 and 180° C. at a curing time of 3 to 15 minutes.

The composition can be utilized wherever desirable feel and grip are needed, such as handles or grips of household or industrial items. Examples of suitable items include, but are not limited to, shaving razors, toothbrushes, writing utensils such as pens or pencils, brushes such as paint brushes and hair brushes, air dryers, tools, for example screwdrivers, hammers, wrenches, pliers and saws, kitchen appliances, for example handles for refrigerators, ovens, microwaves, dishwashers, kitchen utensils, such as spoons, forks, knives, spatulas, can openers, bottle openers, corkscrews, whisks and vegetable peelers, vacuum cleaner handles, brooms, mops, rakes, shovels, scissors, sporting equipment, such as fishing poles, firearms, gun grips, tennis rackets, and golf clubs. The elastomeric compositions may also be coated on fabric, such as making wet grip gloves, non-skid fabrics, etc.

The compositions can also be used in any other applications where good grip performances are essential. The industrial use may include, but not limited to, footwear products, tires, clothes, masks, rain gear, toys, damping materials, building components, coating material for wiring, packaging materials, protection members for computers, computer peripherals, contraceptive devices, sex toys, artificial nipples, disposable diapers, stationery, containers, food trays, balls for sports, ball chairs, protection films, seals, and key covers, shoe soles, medical stoppers, gloves, grips, bath mats, tapes bags, automotive essentials, sports, garden and kitchen tools and or attributes. The composition can also be used for footwear products such as shoe soles and grips and similar applications, where good grip performances are essential.

EXAMPLES

Unless indicated otherwise, parts and percentages are weight based. The following components were used in the Examples:

SBC1 is a linear triblock copolymer based on styrene and ethylene/butylene, S-E/B-S, polystyrene content of 30-33%, a styrene/rubber ratio of 33/67, a diblock content of <1%, Tg of rubber block of −53° C., a specific gravity of 0.91, a molecular weight of 181,000, tensile strength of 38 Mpa, 300% Modulus, MPa of 6.2, Shore A hardness 30 s. of 76.

SBC2 is also a linear triblock copolymer based on styrene and ethylene/butylene, S-E/B-S, polystyrene content of 57%, no maleic anhydride grafting, tensile strength of 28 MPa, 300% Modulus, MPa of 7.9, elongation at break of >600, melt index g/10 min. 5 kg/230° C. of <1, styrene/rubber ratio of 58/42, diblock of <1%, and Tg of rubber block of −15° C.

IR1 is a solution polymerized polyisoprene, made by anionic polymerization, with >90% cis-1,4 content, with a high molecular weight as indicated by its limiting viscosity number of 7.75 dl/g, a tensile strength of >=21.6 MPa, elongation at break of >−428%, 300% Modulus of 0.00860-0.0135 GPa.

Resin A is poly terpene with a softening point Tsp of 115° C. and a glass transition temperature $T_g$ of 61° C.

Resin B is a terpene phenol with a Tsp of 115° C. and a Tg of 62° C.

Resin F is a terpene phenol with a Tsp of 150° C. and a Tg of 97° C.

Resin C is a aromatically modified terpene phenol with a Tsp of 123° C. and a Tg of 75° C.

Resin D is AMS (aromatic pure monomer) with a Tsp of 85° C. and Tg of 39° C.

Resin E is aromatic modified terpene phenol with a Tsp of 118° C. and Tg of 68° C.

Resin G is polyterpene resin with a Tsp of 26° C. and Tg of −20° C.

Resin H is AMS (pure aromatic monomer resin) with a Tsp of 100° C. and Tg of 52° C.

Tensile strength at break (Tb) was measured according to ASTM D412.

Elongation at break was measured according to ASTM D412.

100% modulus, 300% modulus and 500% modulus were measured according to ASTM D412.

Examples 1-8

A number of elastomeric compositions were prepared using a hydrogenated styrenic block copolymer (HSBC) SBC1. Several elastomeric compositions were made including various combinations of resins A through F, as listed in Table 1. Table 2 shows properties of the elastomeric compositions. Tensile strength at break (Tb) was measured according to ASTM D412. Elongation at break (Eb) was measured according to ASTM D412. 100% modulus, 300% modulus and 500% modulus were measured according to ASTM D412.

Examples 9-16

Examples 1-8 were repeated except with a different HSBC SBC2. The formulations are listed in Table 3, and properties are summarized in Table 4.

TABLE 1

| Ingredient (% wt) | Ex. 1 Control | Ex. 2 Resin A | Ex. 3 Resin B | Ex. 4 Resin B | Ex. 5 Resin C | Ex. 6 Resin D | Ex. 7 Resin D | Ex. 8 Resin E |
|---|---|---|---|---|---|---|---|---|
| SBC1 | 28.35 | 28.35 | 28.35 | 28.35 | 28.35 | 28.35 | 28.35 | 28.35 |
| Mineral oil | 42.43 | 32.43 | 32.43 | 37.43 | 32.43 | 32.43 | 37.43 | 32.43 |
| Polypropylene | 11.35 | 11.35 | 11.35 | 11.35 | 11.35 | 11.35 | 11.35 | 11.35 |
| Limestone | 17.00 | 17.00 | 17.00 | 17.00 | 17.00 | 17.00 | 17.00 | 17.00 |
| Epoxy resin | 0.57 | 0.57 | 0.57 | 0.57 | 0.57 | 0.57 | 0.57 | 0.57 |
| Phenolic antiox. | 0.10 | 0.10 | 0.10 | 0.10 | 0.10 | 0.10 | 0.10 | 0.10 |
| Stabilizer | 0.20 | 0.20 | 0.20 | 0.20 | 0.20 | 0.20 | 0.20 | 0.20 |
| Resin A | — | 10.00 | — | — | — | — | — | — |
| Resin B | — | — | 10.00 | 5.00 | — | — | — | — |
| Resin F | — | — | — | — | — | — | — | — |
| Resin C | — | — | — | — | 10 | — | — | — |
| Resin D | — | — | — | — | — | 10 | 5 | — |
| Resin E | — | — | — | — | — | — | — | 10 |
| Total | — | 100.0 | 100.0 | 100.0 | 100.0 | 100.0 | 100.0 | 100.0 |

TABLE 2

| Properties | Ex. 1 Control | Ex. 2 Resin A | Ex. 3 Resin B | Ex. 4 Resin B | Ex. 5 Resin C | Ex. 6 Resin D | Ex. 7 Resin D | Ex. 8 Resin E |
|---|---|---|---|---|---|---|---|---|
| Tensile strenght (psi) | 1824 | 1835 | 1834 | 1888 | 1998 | 2079 | 1901 | 2013 |
| Elongation % | 1267 | 1233 | 1242 | 1234 | 1253 | 1098 | 1170 | 1127 |
| 100% mod | 200 | 215 | 202 | 221 | 215 | 249 | 223 | 241 |
| 300% mod | 322 | 344 | 328 | 348 | 350 | 429 | 375 | 409 |
| 500% mod | 478 | 512 | 490 | 518 | 523 | 658 | 562 | 627 |
| Friction Dry | — | — | — | — | — | — | — | — |
| Static | 1.738 | 1.451 | 1.232 | 1.56 | 1.597 | 1.508 | 1.495 | 1.381 |
| Kinetic | 1.692 | 1.427 | 1.367 | 1.528 | 1.58 | 1.484 | 1.468 | 1.447 |
| Friction Wet | — | — | — | — | — | — | — | — |
| Static (wet) | 1.314 | 1.545 | 1.742 | 1.231 | 1.554 | 1.76 | 2.146 | 1.611 |
| Kinetic (wet) | 1.614 | 1.622 | 1.746 | 1.175 | 1.665 | 1.81 | 2.06 | 1.53 |

TABLE 3

| Ingredient (%wt) | Ex. 9 Control | Ex. 10 Resin A | Ex. 11 Resin B | Ex. 12 Resin B | Ex. 13 Resin C | Ex. 14 Resin D | Ex. 15 Resin D | Ex. 16 Resin E |
|---|---|---|---|---|---|---|---|---|
| SBC2 | 28.35 | 28.35 | 28.35 | 28.35 | 28.35 | 28.35 | 28.35 | 28.35 |
| Mineral oil | 42.43 | 32.43 | 32.43 | 37.43 | 32.43 | 32.43 | 37.43 | 32.43 |
| Polypropylene | 11.35 | 11.35 | 11.35 | 11.35 | 11.35 | 11.35 | 11.35 | 11.35 |
| Limestone | 17.00 | 17.00 | 17.00 | 17.00 | 17.00 | 17.00 | 17.00 | 17.00 |
| Epoxy resin | 0.57 | 0.57 | 0.57 | 0.57 | 0.57 | 0.57 | 0.57 | 0.57 |
| Phenolic antiox. | 0.10 | 0.10 | 0.10 | 0.10 | 0.10 | 0.10 | 0.10 | 0.10 |
| Stabilizer | 0.20 | 0.20 | 0.20 | 0.20 | 0.20 | 0.20 | 0.20 | 0.20 |
| Resin A | — | 10.00 | — | — | — | — | — | — |
| Resin B | — | — | 10.00 | 5.00 | — | — | — | — |
| Resin F | — | — | — | — | — | — | — | — |
| Resin C | — | — | — | — | 10 | — | — | — |
| Resin D | — | — | — | — | — | 10 | 5 | — |
| Resin E | — | — | — | — | — | — | — | 10 |
|  | 100.000 | 100.000 | 100.00 | 100.00 | 100.00 | 100.00 | 100.00 | 100.00 |

TABLE 4

| Properties | Ex. 9 Control | Ex. 10 Resin A | Ex. 11 Resin B | Ex. 12 Resin B | Ex. 13 Resin C | Ex. 14 Resin D | Ex. 15 Resin D | Ex. 16 Resin E |
|---|---|---|---|---|---|---|---|---|
| Tensile at break psi | 644 | 1038 | 1314 | 1003 | 1229 | 1426 | 1034 | 1354 |
| Elongation % | 665 | 875 | 937 | 878 | 928 | 851 | 781 | 872 |
| 100% mod | 188 | 204 | 219 | 198 | 245 | 274 | 240 | 261 |

TABLE 4-continued

| Properties | Ex. 9 Control | Ex. 10 Resin A | Ex. 11 Resin B | Ex. 12 Resin B | Ex. 13 Resin C | Ex. 14 Resin D | Ex. 15 Resin D | Ex. 16 Resin E |
|---|---|---|---|---|---|---|---|---|
| 300% mod | 334 | 361 | 393 | 350 | 411 | 487 | 420 | 455 |
| 500% mod | 496 | 550 | 599 | 525 | 603 | 743 | 629 | 697 |
| Friction Dry | | | | | | | | |
| Static | 1.339 | 1.689 | 1.526 | 1.514 | 1.348 | 1.041 | 1.42 | 1.303 |
| Kinetic | 1.287 | 1.737 | 1.512 | 1.554 | 1.306 | 1.07 | 1.427 | 1.389 |
| Friction Wet | | | | | | | | |
| Static (wet) | 1.18 | 1.548 | 1.946 | 2.409 | 1.056 | 1.139 | 1.376 | 1.195 |
| Kinetic (wet) | 1.223 | 1.718 | 1.998 | 2.319 | 1.44 | 1.29 | 1.408 | 1.37 |

Examples 17-25

A number of examples with formulations containing an isoprene rubber shown Table 5. The composition was prepared such that components (a), (b), and (e) were uniformly kneaded in an open roller at a temperature of ±120° C. Components (c) and (d) were added in an open roller at a temperature of ±75° C. and again the mixture was uniformly kneaded. The kneaded rubber was cut off from the roller to a sheet having 2 mm to 3 mm thickness. The sheet was maturated at room temperature for one day and night.

The matured rubber was cured or vulcanized by a heating press machine at 150° C. and 15 MPa for 7-9 minutes to obtain a test sample to measure the physical and chemical properties. The properties of the composition are shown in Table 6.

TABLE 5

| Components | Ex. 17 control | Ex. 18 | Ex. 19 control | Ex. 20 | Ex. 21 | Ex. 22 | Ex. 23 | Ex. 24 | Ex. 25 |
|---|---|---|---|---|---|---|---|---|---|
| IR1 | 82.1 | 78.5 | 72.9 | 69.8 | 66.8 | 69.8 | 66.8 | 69.8 | 66.8 |
| Syndiotactic 1,2-polybutadiene | 18.2 | 8.7 | 18.2 | 17.4 | 16.7 | 17.4 | 16.7 | 17.4 | 16.7 |
| Organic peroxide | 0.14 | 0.13 | 0.14 | 0.13 | 0.13 | 0.13 | 0.13 | 0.13 | 0.13 |
| Sulfur | — | — | 0.04 | 0.03 | 0.03 | 0.03 | 0.03 | 0.03 | 0.03 |
| TMPTMA | 7.30 | 7.0 | 7.29 | 7.0 | 6.7 | 7.0 | 6.7 | 7.0 | 6.7 |
| Phenolic antiox. | 0.46 | 0.47 | 0.46 | 0.44 | 0.42 | 0.44 | 0.42 | 0.44 | 0.42 |
| Stabilizer | — | — | 0.91 | 0.87 | 0.84 | 0.87 | 0.84 | 0.87 | 0.84 |
| Resin E | 0.91 | 0.87 | — | 4.36 | 8.35 | — | — | — | — |
| Resin G | — | — | — | — | — | 4.36 | 8.35 | — | — |
| Resin H | — | 4.4 | — | — | — | — | — | 4.36 | 8.35 |
| Total | 100.0 | — | 100.0 | 100.0 | 100.0 | 100.0 | 100.0 | 100.0 | 100.0 |

TABLE 6

Properties of elastomeric compositions including isoprene

| Property | Ex. 17 control | Ex. 18 | Ex. 19 control | Ex. 20 | Ex. 21 | Ex. 22 | Ex. 23 | Ex. 24 | Ex. 25 |
|---|---|---|---|---|---|---|---|---|---|
| Tensile strength MPa ISO 37: 2005 | 6.2 | 5.0 | 6.4 | 6.4 | 6.8 | 5.9 | 6.0 | 6.5 | 6.2 |
| Modulus at 100% MPa ISO 37: 2005 | — | 0.7 | 1.4 | 1.2 | 1.2 | 1.1 | 1.0 | 1.3 | 1.2 |
| Elongation at break ISO 37: 2005 | 472 | 504 | 387 | 479 | 501 | 553 | 668 | 388 | 466 |
| Tear Strength kN/m ASTM D624 | 25.0 | 24.9 | 27 | 22 | 21 | 21 | 21 | 28 | 22 |
| Hardness Shore A, 30 sec. ASTM D2240 | — | 26.3 | 44.6 | 40.1 | 39.4 | 39.7 | 37.2 | 43.1 | 41 |
| COF (Dry) | — | — | 1.644 | 1.737 | 1.984 | 1.919 | 1.767 | 2.208 | 2.308 |
| COF (Wet) | — | — | 1.393 | 1.29 | 1.549 | 1.275 | 1.417 | 1.867 | 1.75 |

The terms "a," "an," and "the" are intended, unless specifically indicated otherwise, to include plural alternatives, e.g., at least one. Herein, while compositions and processes are described in terms of "comprising" various components or steps, the compositions and methods can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment whether or not the statement is explicitly recited.

While various aspects have been shown and described, modifications thereof can be made by one skilled in the art without departing from the spirit and teachings of the disclosure. The aspects described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

All publications, patent applications, and patents mentioned herein are incorporated by reference in their entirety. In the event of conflict, the present specification, including definitions, is intended to control. With respect to all ranges disclosed herein, such ranges are intended to include any combination of the mentioned upper and lower limits even if the particular combination is not specifically listed.

The invention claimed is:

1. An elastomeric composition comprising:
   a) from 3 to 50 wt. % of a resin selected from the group consisting of a petroleum hydrocarbon resin, terpene based resins, styrene-alpha-methyl-styrene resins, and copolymers and/or mixtures thereof;
   b) a first polymer in an amount of 40-95 wt % based on the total weight of the elastomeric composition, the first polymer selected from the group consisting of:
      i) a selectively hydrogenated block copolymer having a general configuration A-B-A, (A-B)n, (A-B-A)n, (A-B-A)nX, (A-B)nX or mixtures thereof,
      wherein n is an integer from 2 to 30, and X is a coupling agent residue, and
      wherein prior to hydrogenation,
      A is a polymer block of one or more mono alkenyl arenes, having a number average molecular weight between 3,000 and 60,000; and
      B is a controlled distribution copolymer block of at least one conjugated diene and at least one mono alkenyl arene, having a number average molecular weight of 30,000 to 300,000;
      ii) a selectively hydrogenated block copolymer having the general configuration S-E-S, $(S-E1)_n$, $(S-E1)_nS$, $(S-E1)_nX$ or mixtures thereof,
      wherein n has a value of 2 to 6, and X is a coupling agent residue, and
      wherein prior to hydrogenation,
      S is a polystyrene block,
      E is a polydiene block, selected from the group consisting of polybutadiene, polyisoprene and mixtures thereof, having a number average molecular weight of from 20,000 to 220,000, and
      E1 is a polydiene block, selected from the group consisting of polybutadiene, polyisoprene and mixtures thereof, having a number average molecular weight of from 20,000 to 220,000;
      iii) a homopolymer of isoprene, or a copolymer of isoprene and another conjugated diene and/or an olefinically unsaturated monomer, wherein the copolymer can be of random, tapered, or block structure; and combinations thereof;
   c) a second polymer in an amount of 5-55 wt %, wherein the second polymer is selected from the group of a styrene isoprene styrene (SIS), a styrene-ethylene-butadiene-styrene (SEBS), and combinations thereof, and wherein the second polymer is different from the first polymer;
   d) optionally, at least one of a softener, a plasticizer, an antioxidant, a stabilizer, a colorant, and a filler, in an amount up to 80 wt. %; and
   e) 0.03-25 wt % of a curing agent, said curing agent comprising a peroxide;
   wherein the composition has a static coefficient of friction in wet state of at least 1.2 and a kinetic coefficient of friction in wet state of 1.2.

2. The elastomeric composition of claim 1, wherein
the first polymer is a homopolymer of isoprene, or a copolymer of isoprene and another conjugated diene and/or an olefinically unsaturated monomer, wherein the copolymer can be of random, tapered, or block structure,
the curing agent further comprises x) sulphur or, sulfur-containing compounds; and y) a co-agent selected from the group consisting of monofunctional-, difunctional- and trifunctional methacrylic monomers; and
wherein the composition is cured at a temperature between 135° C.-185° C. for at least 5 minutes.

3. The elastomeric composition of claim 1, wherein the composition has a static coefficient of friction in a wet state of at least 1.6 and a kinetic coefficient of friction in wet state of at least 1.6.

4. The elastomeric composition of claim 1, wherein
the first polymer is a selectively hydrogenated block copolymer having a general configuration A-B-A, (A-B)n, (A-B-A)n, (A-B-A)nX, (A-B)nX or mixtures thereof,
wherein n is an integer from 2 to 30, X is a coupling agent residue, and
wherein prior to hydrogenation,
B is a controlled distribution copolymer block of at least one conjugated diene and at least one mono alkenyl arene, having a number average molecular weight of 30,000 to 300,000; and
each block A is a polymer block of one or more mono alkenyl arenes having a number average molecular weight between 3,000 and 60,000.

5. The elastomeric composition of claim 1, wherein
the first polymer is a selectively hydrogenated block copolymer having a general configuration S-E-S, $(S-E1)_n$, $(S-E1)_nS$, $(S-E1)_nX$ or mixtures thereof,
wherein n has a value of 2 to 6 and X is a coupling agent residue, and wherein prior to hydrogenation, S is a polystyrene block, E is a polydiene block, selected from the group consisting of polybutadiene, polyisoprene and mixtures thereof, having a number average molecular weight of from 20,000 to 220,000, and E1 is a polydiene block, selected from the group consisting of polybutadiene, polyisoprene and mixtures thereof, having a number average molecular weight of from 20,000 to 220,000.

6. The elastomeric composition of claim 1, wherein the first polymer is a homopolymer of isoprene, or a copolymer of isoprene and another conjugated diene and/or olefinically unsaturated monomer, wherein the copolymer can be of random, tapered, or block structure.

7. The elastomeric composition of claim 2, wherein the co-agent is selected from the group consisting of ethylene glycol dimethacrylate (EGDMA), diethylene glycol dimethacrylate (DEGDMA), triethylene glycol dimethacrylate (TiEGDMA), 1,3-butylene glycol dimethacrylate (BGDMA), trimethylolpropane trimethacrylate (TMPTMA) triallyl isocyanurate, triallyl cyanurate, diethylene glycol diacrylate, neophenylene glycol diacrylate and mixtures thereof.

8. The elastomeric composition of claim 2, wherein the curing agent is 1,1-di(tert-butylperoxy)-3,3,5-trimethylcyclohexane, and the co-agent is trimethylolpropane trimethacrylate.

9. The elastomeric composition of claim 6, wherein the composition has a tensile strength at break, measured according to ASTM D412, of at least 1000 psi.

10. The elastomeric composition of claim 6, wherein the composition has a 300% modulus, measured according to ASTM D412, of at least 200.

11. The elastomeric composition of claim 1, wherein the composition has a Type A Durometer hardness, measured at 30 seconds, of at least 35.

12. The elastomeric composition of claim 1, wherein the resin is a terpene based resin.

13. The elastomeric composition of claim 1, wherein the resin is a terpene phenol resin having a Tsp ranging from 85° C. to 160° C., and a hydroxyl number ranging from 5 mg KOH/g to 240 mg KOH/g.

14. The elastomeric composition of claim 1, wherein the resin is a vinyl aromatic resin having a Tsp from 80° C. to 130° C.

15. The elastomeric composition of claim 1, wherein the resin is selected from the group consisting of terpene polymers, styrene-alpha-methyl-styrene resins, copolymers thereof, and mixtures thereof.

16. The elastomeric composition of claim 1, wherein the resin is selected from the group consisting of indene resins, aromatic vinyl polymers, and C9 hydrocarbon resins.

17. An article comprising the elastomeric composition of claim 1.

18. A composite formed by bonding the elastomeric composition of claim 1 with a substrate by any of bonding, molding or using an adhesive, wherein the substrate comprises a polymer.

19. A method for making an elastomeric composition having improved wet grip, the method comprises:
a) mixing:
i) from 3 to 50 wt. % of a resin selected from the group consisting of a petroleum hydrocarbon resin, terpene polymers, styrene-alpha-methyl-styrene resins, and copolymers and/or mixtures thereof;
ii) 40-95 wt % of a homopolymer of isoprene, or a copolymer of isoprene and another conjugated diene and/or an olefinically unsaturated monomer, wherein the copolymer can be of random, tapered, or block structure;
iii) 5-55 wt % of a styrene-butadiene rubber;
iv) a curing agent, said curing agent comprising a peroxide;
v) a co-agent selected from monofunctional-, difunctional- or trifunctional methacrylic monomers; and
vi) optionally, at least one of a softener, a plasticizer, an antioxidant, a stabilizer, a colorant, a filler, and mixtures thereof in an amount of 0 to 80 wt. %;
b) curing the mixture for at least 5 minutes at a temperature between 135° C. and 185° C.;
wherein the composition has a static coefficient of friction in a wet state of at least 1.2 and a kinetic coefficient of friction in wet state of at least 1.2.

20. A method for making an elastomeric composition having improved wet grip, the method comprises mixing:
a) from 3 to 50 wt. % of a resin selected from the group consisting of a petroleum hydrocarbon resin, terpene polymers, styrene-alpha-methyl-styrene resins, and copolymers and/or mixtures thereof;
b) 40-95 wt % of a first polymer selected from the group consisting of:
i) a selectively hydrogenated block copolymer having a general configuration A-B-A, (A-B)n, (A-B-A)n, (A-B-A)nX, (A-B)nX or mixtures thereof,
wherein n is an integer from 2 to 30, and X is a coupling agent residue, and
wherein prior to hydrogenation,
A is a polymer block of one or more mono alkenyl arenes, having a number average molecular weight between 3,000 and 60,000; and
B is a controlled distribution copolymer block of at least one conjugated diene and at least one mono alkenyl arene, having a number average molecular weight of 30,000 to 300,000;
ii) a selectively hydrogenated block copolymer having the general configuration S-E-S, (S-E1)$_n$, (S-E1)$_n$S, (S-E1)$_n$X or mixtures thereof,
wherein n has a value of 2 to 6, and X is a coupling agent residue, and
wherein prior to hydrogenation,
S is a polystyrene block,
E is a polydiene block, selected from the group consisting of polybutadiene, polyisoprene and mixtures thereof, having a number average molecular weight of from 20,000 to 220,000, and
E1 is a polydiene block, selected from the group consisting of polybutadiene, polyisoprene and mixtures thereof, having a number average molecular weight of from 20,000 to 220,000;
iii) a homopolymer of isoprene, or a copolymer of isoprene and another conjugated diene and/or an olefinically unsaturated monomer, wherein the copolymer can be of random, tapered, or block structure; and combinations thereof;
c) 5-55 wt % of a second polymer selected from the group consisting of a styrene isoprene styrene (SIS), a styrene-ethylene-butadiene-styrene (SEBS), and combinations thereof, and wherein the second polymer is different from the first polymer;
d) optionally, at least one of a softener, a plasticizer, an antioxidant, a stabilizer, a colorant, and a filler, in an amount of 0 to 80 wt. %; and e) 0.03-25 wt % of a curing agent, said curing agent comprising a peroxide;

wherein the composition has a static coefficient of friction in a wet state of at least 1.2 and a kinetic coefficient of friction in wet state of at least 1.2.

* * * * *